(12) United States Patent
McLaughlin et al.

(10) Patent No.: US 6,374,988 B1
(45) Date of Patent: Apr. 23, 2002

(54) ACCUMULATING CONVEYOR FOR ELONGATED STOCK

(75) Inventors: Frederick A. McLaughlin, Columbiana; Duane C. Reed, Rogers, both of OH (US)

(73) Assignee: Fairfield Machine Company, Inc., Columbiana, OH (US)

( * ) Notice: Subject to any disclaimer, the term of this patent is extended or adjusted under 35 U.S.C. 154(b) by 0 days.

(21) Appl. No.: 09/497,011

(22) Filed: Feb. 2, 2000

(51) Int. Cl.$^7$ ............................................... B65G 43/00
(52) U.S. Cl. ............................... 198/460.1; 198/46.03; 198/614; 198/775
(58) Field of Search ............................ 198/444, 460.1, 198/460.3, 461.1, 468.6, 572, 575, 613, 614, 773, 775, 751

(56) References Cited

U.S. PATENT DOCUMENTS

| | | |
|---|---|---|
| 701,024 A | 5/1902 | Edwards |
| 793,926 A | 7/1905 | Edwards |
| 863,842 A | 8/1907 | George |
| 2,796,780 A | 6/1957 | MacGregor et al. ............ 80/42 |
| 3,722,662 A * | 3/1973 | Wakabayashi et al. ...... 198/614 |
| 3,891,081 A | 6/1975 | Schirmag .................... 198/218 |
| 6,047,812 A * | 4/2000 | Horn et al. .............. 198/460.3 |

FOREIGN PATENT DOCUMENTS

JP          57-41725          9/1983

\* cited by examiner

Primary Examiner—Joseph E. Valenza
(74) Attorney, Agent, or Firm—Carothers & Carothers

(57) ABSTRACT

An accumulating conveyor for elongated stock, such as tubes, rods, bars and similar articles. At least three independently operable conveyor banks are arranged for sequentially transferring elongated stock from one bank to the next. Each conveyor bank includes a number of elongated substantially parallel racks which extend in the direction of desired conveyance and each rack has at least two adjacent rows of teeth extending longitudinally along the rack. The teeth of one row of each rack are staggered with respect to the teeth of the other row and a drive is connected to alternately raise one row of teeth above the other whereby elongated stock placed transversely on one end of the racks will be moved to the other end of the racks for offloading or transfer to an adjacent conveyor bank. Sensors are positioned for sensing the presence of elongated stock on each conveyor bank and for energizing and deenergizing selected ones of the conveyer bank drives whereby elongated stock fed into one end of the accumulator conveying apparatus is moved to the other end and elongated stock is accumulated on the intermediate conveyor banks.

9 Claims, 4 Drawing Sheets

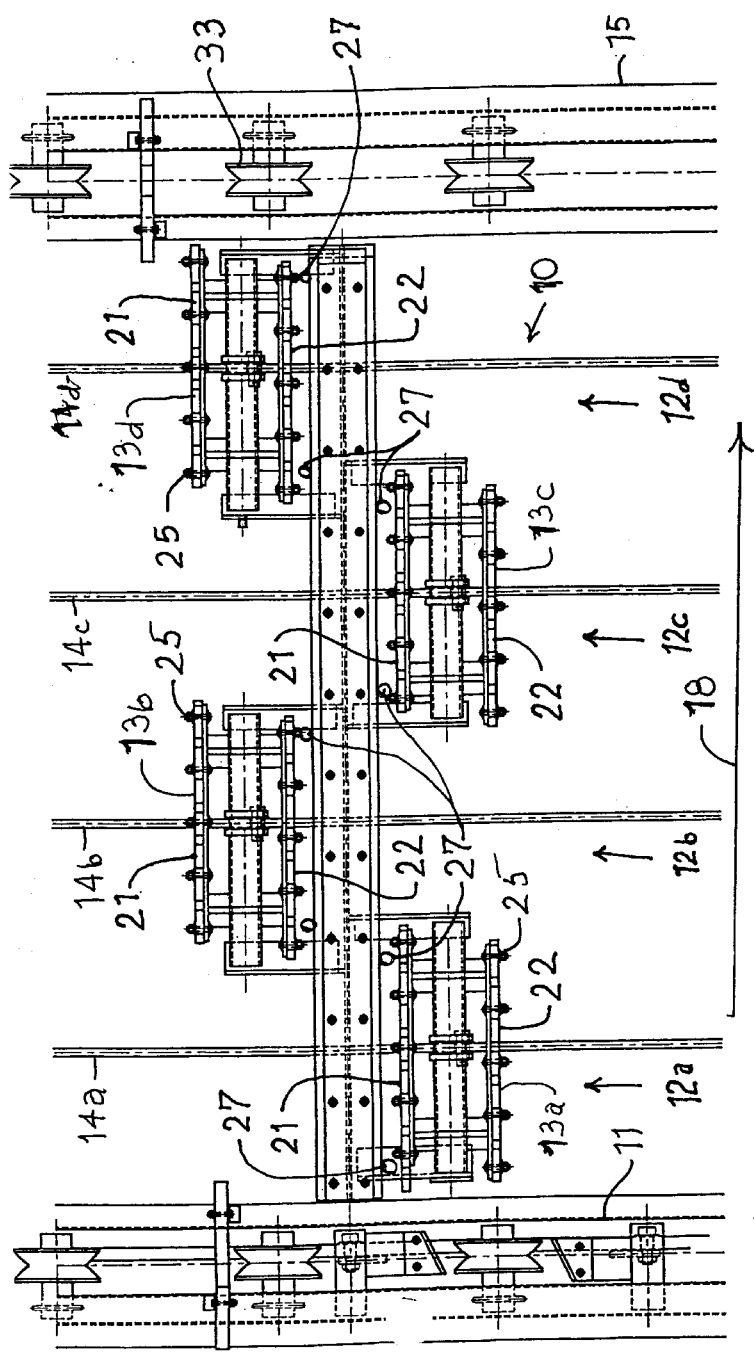
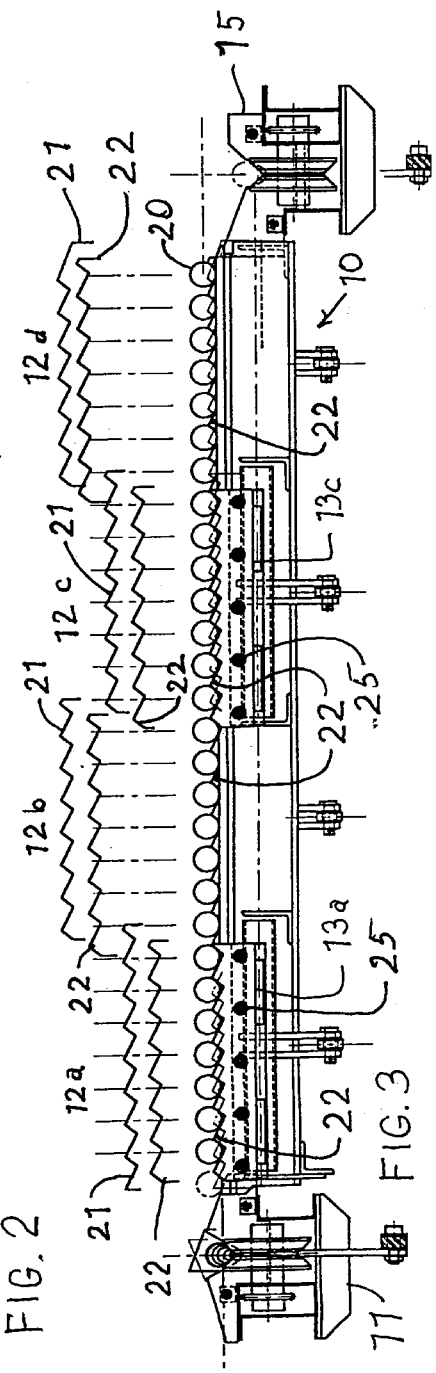

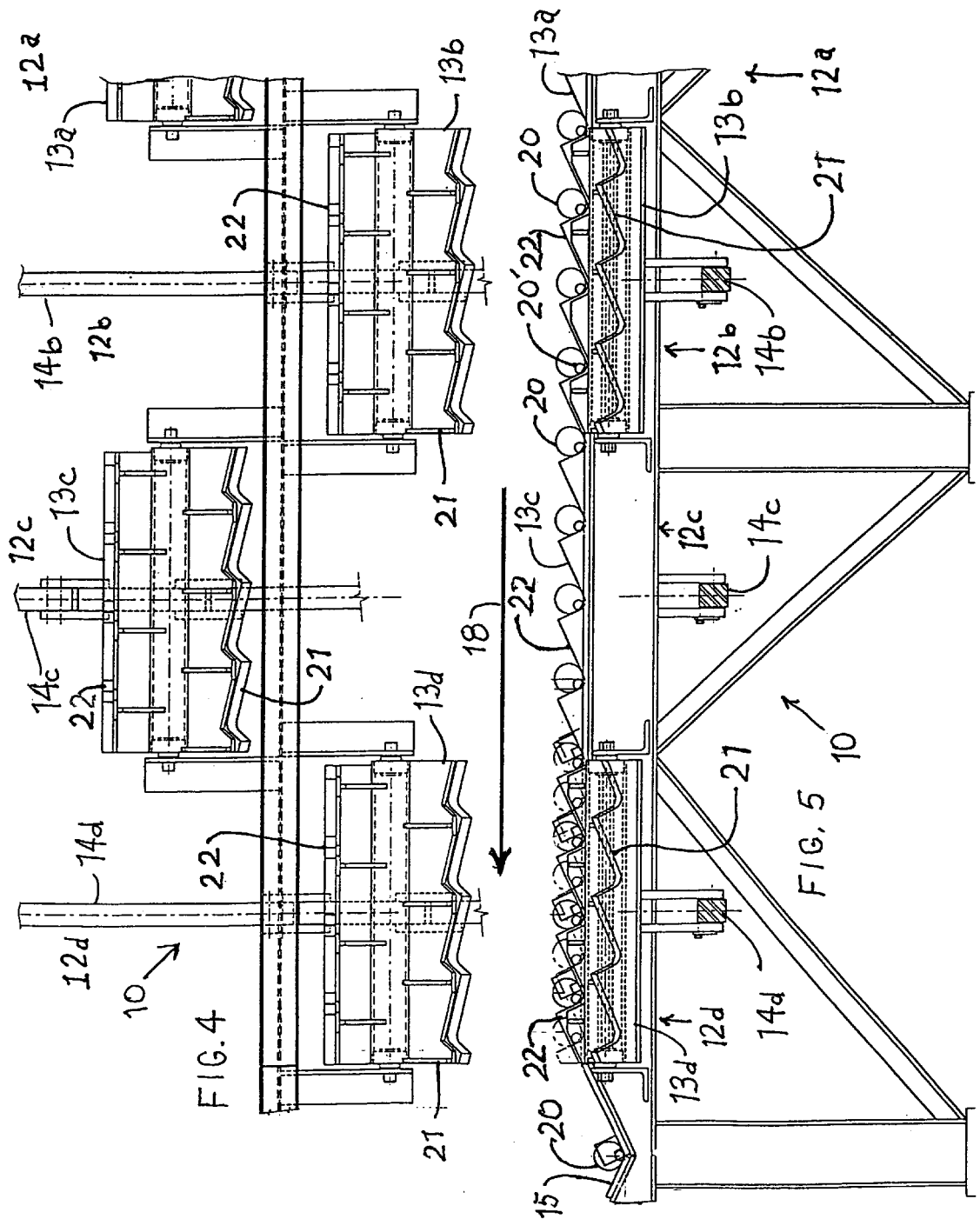

ACCUMULATING CONVEYOR FOR ELONGATED STOCK

BACKGROUND OF THE INVENTION

This invention relates to an accumulating conveyor, and more particularly to an accumulating conveyor for transverse transportation of elongated stock, such as pipes, tubes, rods, bars and like articles.

Various types of accumulating conveyors are available. For example walking beam accumulating conveyors, such as the type illustrated in U.S. Pat. No. 5,454,466, and accumulating conveyors which utilize a continuous moving conveyor portion which accumulates articles and delays or halts progress of the articles by lifting the articles from the continuous conveyor are known. Other accumulating conveyors accumulate articles on a stationary conveyor which is selectively operated to advance the articles, and yet others use stationary portions to accumulate articles, the articles being engaged for advancement by selectively operated article engaging mechanisms.

There are also known conveyors for conveying elongated stock in a transverse direction which include a number of elongated substantially parallel racks which extend in the direction of desired conveyance. Each rack is provided with two or more adjacent rows of teeth extending longitudinally with the rack, and the teeth of one row are staggered with respect to the teeth of the other row and a drive is connected for alternately raising one row of teeth above the other whereby elongated stock placed transversely on one end of the conveyor racks will be moved to the other end of the conveyor racks for offloading. Examples of this category of conveyor are illustrated in U.S. Pat. Nos. 701,024; 793,296; 863,842; 2,796,780 and 3,891,081, and Japanese Patent No. 58-162416. The latter referenced conveyor described in the Japanese reference operates in a different manner than the previously mentioned conveyors, but nevertheless, is in the same category as described.

An adequate accumulating conveyor incorporating this particular category of conveyor for elongated stock is not available on the market and it is accordingly an object of the present invention to provide such an accumulating conveyor which is inexpensive to manufacture, economic to operate and most importantly extremely effective in not only conveying the elongated product in a transverse direction, but to further effectively and efficiently accumulate the elongated stock between ends of the accumulating conveyor.

SUMMARY OF THE INVENTION

The accumulator conveying apparatus of the present invention is provided for elongated stock, such as tubes, rods, bars and the like, and is comprised of at least three independently operable conveyor banks arranged for sequentially transferring elongated stock from one bank to the next. Each conveyor bank or section consists of a conveyor type of the prior art category previously described wherein each conveyor bank or section includes a plurality of elongated substantially parallel racks which extend in the direction of desired conveyance and each rack has at least two adjacent rows of teeth extending longitudinally along the rack. The teeth of one row are staggered with respect to the teeth of the other row and a drive is connected for alternately raising one row of teeth above the other whereby elongated stock placed transversely on one end of the racks will be moved to the other end of the racks of each conveyor bank or section for offloading or for transfer to an adjacent conveyor bank.

Sensors are provided on each conveyor bank and positioned for sensing the presence of elongated stock on each conveyor bank and for energizing and de-energizing selected ones of the conveyor bank drives whereby elongated stock transversely fed onto one end of the entire accumulator conveying apparatus is moved to the other end of the accumulating conveying apparatus and in addition the elongated stock is accumulated thereon between the conveyor ends.

The teeth provided on the conveyor may be of resilient material for preventing marring of elongated stock being conveyed thereon. The parallel conveyor racks may be comprised of bars with two or more rows of teeth projecting from the bars, and the drives are connected for synchronously oscillating the conveyor bars on their longitudinal axis of rotation. This is the type of conveyor and type of conveyor drive are described in the aforementioned U.S. patents. However, the accumulating conveyor of the present invention may also incorporate conveyor banks or sections therein which operate in the manner described in the afore-referenced Japanese patent.

If desired, adjustment may be provided for adjusting the actual degree of staggering between the adjacent rows of conveyor teeth on each conveyor rack.

Normally the sensors are positioned whereby intermediate conveyor banks are controlled for accumulating elongated stock being conveyed thereon and the last conveyor bank drive is further connected to a demand sensor for delivering a single piece of elongated stock upon demand from the last conveyor bank to a subsequent material handling system. In this manner, elongated stock is fed one at a time to a subsequent material handling system for operations to be performed on the stock, and backup elongated stock is accumulated on the conveyor system on the intermediate conveyor banks or sections.

BRIEF DESCRIPTION OF THE DRAWINGS

Other objects and advantages appear hereinafter in the following description and claims. The accompanying drawings show, for the purpose of exemplification, without limiting the invention or appended claims, certain practical embodiments of the present invention wherein:

FIG. 2 is an enlarged plan view of the lefthand portion of the accumulating conveyor apparatus illustrated in FIG. 1 oriented 90° to the right and illustrating the incorporation of only four conveyor banks, instead of the seven conveyor banks shown in FIG. 1;

FIG. 3 is a bottom end view in elevation of the conveyor apparatus illustrated in FIG. 2 which further also schematically illustrates how the two adjacent rows of teeth for each conveyor rack are staggered with respect to each other for providing proper operation of the conveyor apparatus;

FIG. 4 is an enlarged plan view illustrating details of the three lefthand conveyor banks shown in FIG. 2;

FIG. 5 is a view in end elevation of the three conveyor racks shown in FIG. 4;

DETAILED DESCRIPTION OF THE PREFERRED EMBODIMENTS

Figure 1:
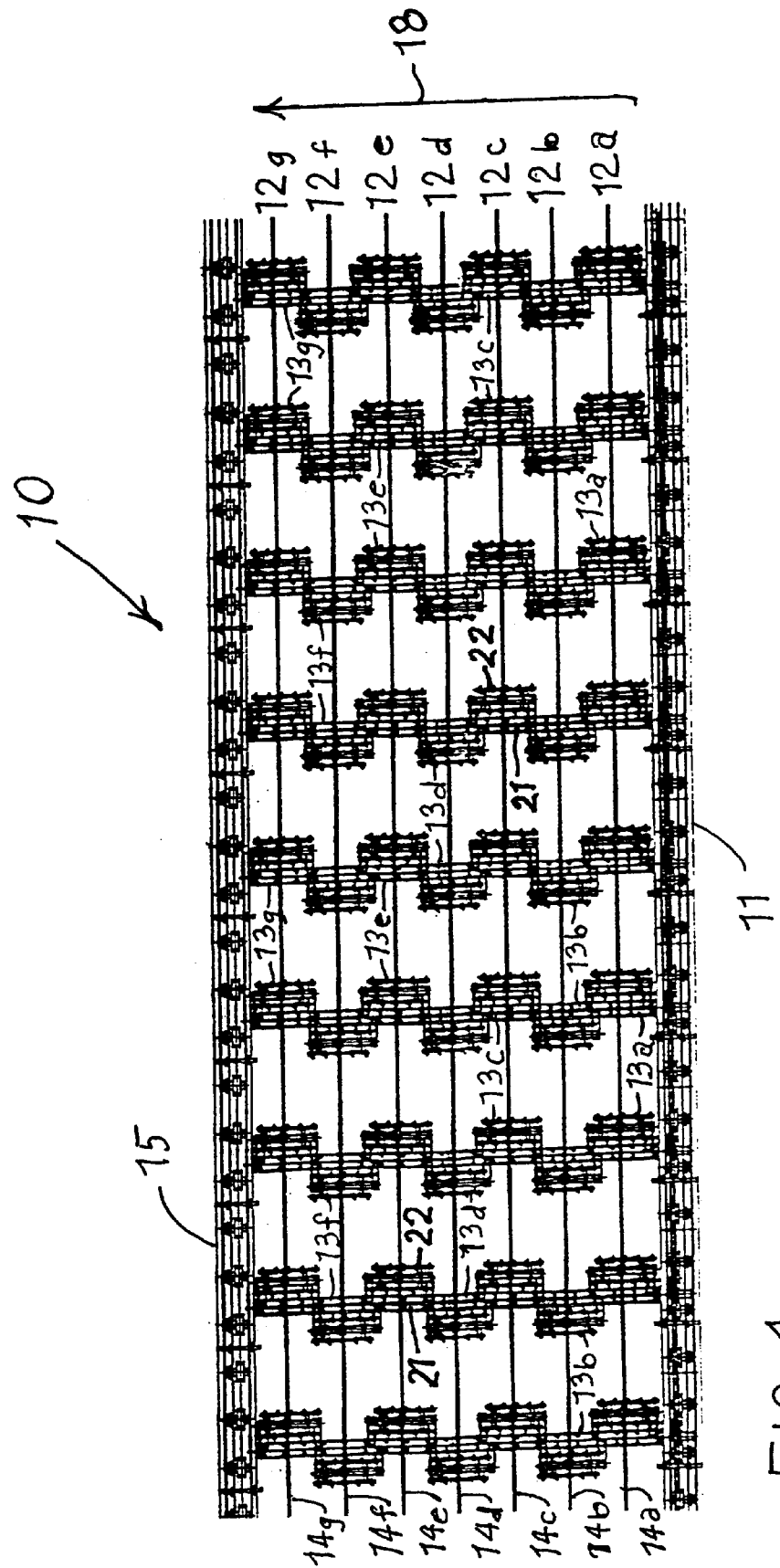
FIG. 1 is a schematic plan view illustrating an accumulator conveying apparatus for conveying elongated stock in accordance with the teachings of the present invention illustrates the use of seven conveyor banks arranged sequentially for transferring elongated stock from one bank to the next.

Referring first to FIG. 1, the accumulator conveying apparatus 10 of the present invention is schematically illustrated for conveying elongated stock, such as tubes, rods, bars and like articles. The accumulator conveying apparatus 10 includes at least three independently operable conveyor banks 12 and in this embodiment seven banks 12a through 12g are provided for sequentially transferring elongated stock transversely from one bank to the next in the direction indicated by arrow 18.

Each conveyor bank 12 includes a plurality of elongated substantially parallel racks 13 which extend in the direction of desired conveyance or in the direction of arrow 18. These parallel conveyor racks 13 are illustrated in FIG. 1 as racks 13a for bank 12a on through 13g for conveyor bank 12g. In this particular conveying apparatus 10 illustrated, each of the banks 12 are illustrated as having nine parallel conveyor racks 13.

Elongated stock is fed into the conveying apparatus 10 from right to left on loading conveyor 11 which conveys the elongated stock from right to left as seen in the figure until it is aligned with the conveyor banks 12 by driven rollers. The elongated stock is then stopped on loading conveyor 11 and a cam system, illustrated in more detail hereinafter, is raised to transfer the elongated stock onto parallel racks 13a of conveyor bank 12a.

Each of the conveyor banks 12a through 12g are independently operated through actuation linkage rods 14a through 14g respectively. Each of these actuation linkage rods is connected to an oscillating drive (not shown in the figure) which is independently operated to oscillate the respective rods 14 left and right as seen in the figure. This drive action conveys elongated stock placed transversely on a respective bank 12 whereby the racks 13 thereof when driven in unison will move the stock to the far end of the racks 13 for either off loading or transfer to an adjacent conveyor bank 12. Elongated stock is offloaded from the last conveyor bank 12g transversely onto pickup roller conveyor 15 one by one for transfer to a subsequent material handling system. Pickup conveyor 15 is roller driven and drives the elongated stock to the left thereon as viewed in FIG. 1.

Referring in addition to the remaining figures, FIGS. 2 through 7, greater detail of the accumulator conveying apparatus 10 is illustrated. These figures depict an accumulating apparatus 10 with four independently operable conveyor banks 12a through 12d instead of 7 as illustrated in FIG. 1. Each of these independently operable conveyor banks 12 are arranged for sequentially transferring elongated stock from one conveyor bank 12 to the next as illustrated by arrow 18.

Elongated tubular stock 20 is illustrated schematically in end view as resting on the respective conveyor banks in FIGS. 3 and 5. Note also in FIG. 5 that elongated tubular stock of smaller diameter is also schematically illustrated at 20' to illustrate that elongated stock of different diameters can be conveyed on this system. In fact, stock of many different cross configurations may be conveyed, such as, but not limited to, square, rectangular, triangular, etc.

Each conveyor bank 12 is of the same class or type as illustrated in the aforementioned U.S. patent references and each bank 12 operates in a similar manner as described in these U.S. patent references.

As previously indicated, each conveyor bank 12 includes a plurality of elongated substantially parallel racks 13 which extend in the direction of desired conveyance as indicated by arrows 18. Each rack 13 is provided with two adjacent rows of teeth 21 and 22 respectively extending longitudinally along each respective rack 13.

The teeth 21 of one row in each rack 13 are staggered with respect to the teeth of the other row 22. This is best illustrated diagrammatically at the top of FIG. 3. In fact, the degree of staggering between teeth rows 21 and 22 can be varied by loosening bolts 25 and thereby adjusting the rows 21 and 22 in either direction through slotted openings. This detail is illustrated in FIGS. 2 and 3.

Figure 6:
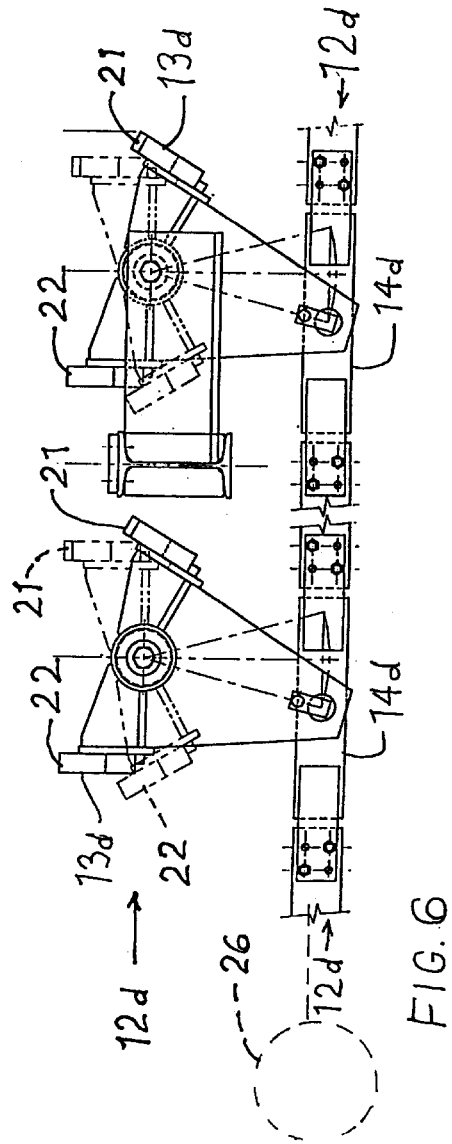
FIG. 6 is an enlarged left end view in elevation of the conveyor racks for the last conveyor bank shown in FIG. 4 with intermediate conveyor racks removed.

Each bank 12 is independently driven by a drive 26 schematically illustrated in FIG. 6. These drives 26 illustrated are air cylinder drives which are directly coupled to actuating rods 14 and they cause the actuating rods 14 to oscillate left and right as illustrated in FIG. 6 thereby alternately raising one row of teeth 22 above the other row 21 of each bank 12 (see FIG. 6) whereby elongated stock placed transversely on one end of the racks 13 will be moved to the other end of the racks as indicated by the arrows 18 for offloading to a pickup station 15 or for transfer to an adjacent conveyor bank 12.

As previously explained, these conveyor banks individually function in the same manner as illustrated in the afore-referenced U.S. patent references, and in addition, more than two rows of teeth 21 and 22 may be provided as taught in U.S. Pat. No. 3,891,081.

The drives 26 need not be pneumatically operated and may be electrically or hydraulicly actuated.

As is best seen in FIG. 2, sensors 27 are selectively positioned on each conveyor bank for sensing the presence of elongated stock on each conveyor bank. These sensors are connected through a conventional CNC, or preferably a PLC, which is programmed in response to signals from the sensors to energize and deenergize selected ones of the drives 26 whereby elongated stock 20 fed into one end of the accumulating conveyor apparatus 10 is moved to the other end of the accumulator conveying apparatus as illustrated by arrows 18. By selectively energizing the conveyor banks independently through a programed CNC or PLC control, elongated stock is accumulated on the conveyor 10 between the conveyor ends on intermediate conveyor banks 12b through 12f of FIG. 1 or intermediate banks 12c and 12b of FIG. 2.

The first bank 12a of the conveyor 10 receives product one at a time from a previous operation from loading conveyor 11 until bank 12a is filled. Sensors 27 on bank 12a will recognize the presence or absence of elongated stock thereon and will index elongated stock along rack 13a only one step at a time as the first tooth in the rack 13a is filled until bank 12a is full. Once full, the first bank 12a will automatically index all of the product from the first bank onto the second bank 12b.

In other words, the control system through the sensors will simultaneously operate banks 12a and 12b so that all the product from the first bank 12a is transferred to the second bank 12b.

Then the first bank 12a reverts back to sequencing on demand as previously indicated from the previous operation while the second bank 12b automatically transfers the batch of product to the subsequent banks in the same manner previously described until the stock reaches the final bank within the system which is bank 12d in FIGS. 2 through 7. At this point, final bank 12d will stop and will deliver a single product upon demand to a subsequent operation by delivering elongated stock 20 one at a time onto pickup conveyor 15.

While this operation is proceeding, intermediate banks 12*b* and 12*c* will accumulate stock. Upon subsequent filling of the first conveyor bank 12*a*, the group of product from the first bank 12*a* will be automatically advanced to the open bank 12 closest to the last bank 12*d* and wait for introduction into the last bank when the last bank 12*d* becomes empty.

Figure 7:
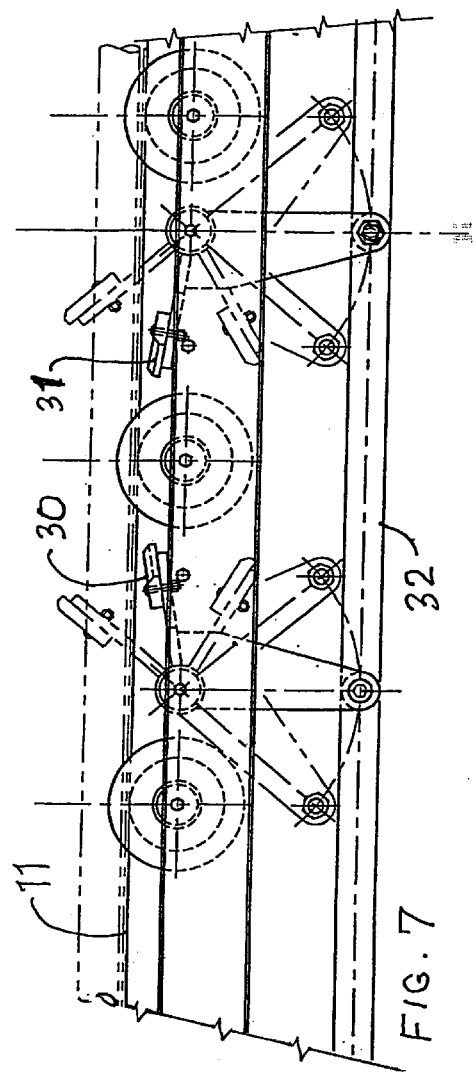
FIG. 7 is an enlarged view in end elevation illustrating the left side of the loading conveyor shown in FIG. 2.

In FIG. 2, sensors 27 are illustrated as being positioned to detect the presence of stock at the beginning and end of each conveyor bank 12. However, they may be further installed so that there is a sensor at each conveyor position on each rack 13. These sensors 27 may be any conventional sensor, such as proximity switches, infrared sensors or the like. Loading conveyor 11 is a conventional power driven roller conveyor which incorporates cams 30 for offloading stock onto the conveyor 10 when raised as illustrated in FIG. 7. Cams 31 when raised, will offload stock in the opposite direction. These cams are operated by another drive 26 through actuating rod 32.

Pickup conveyor 15 is also of conventional design and is provided with driven rolls 33.

The rows of teeth 21 and 22 are preferably constructed of a durable plastic or other resilient material in order to prevent marring of the elongated stock being conveyed by the teeth. In situations wherein plastic or other resilient materials are not appropriate, other materials may be substituted.

We claim:

1. An accumulator conveying apparatus for elongated stock such as tubes, rods, bars and like articles comprised of:
    at least three independently operable conveyor banks arranged for sequentially transferring elongated stock from one bank to the next;
    each conveyor bank including a plurality of elongated substantially parallel racks which extend in the direction of desired conveyance, each rack having at least two adjacent rows of teeth extending longitudinally along the rack, the teeth of one row staggered with respect to the teeth of the other row and a drive connected for alternately raising one row of teeth above the other whereby elongated stock placed transversely on one end of the racks will be moved to the other end of the racks for off loading or transfer to an adjacent conveyor bank; and
    sensors on each conveyor bank positioned for sensing the presence of elongated stock on each conveyor bank and for energizing and de-energizing selected ones of said drives whereby elongated stock fed onto one end of said accumulator conveying apparatus is moved to the other end of said accumulator conveying apparatus and the elongated stock is accumulated thereon between the conveyor ends.

2. The accumulator conveying apparatus of claim 1 wherein said teeth are comprised of resilient material for preventing marring of elongated stock being conveyed thereon.

3. The accumulator conveying apparatus of claim 1, said parallel conveyor racks comprised of bars with said at least two rows of teeth projecting from said bars, and each of said drives including means for synchronously oscillating said conveyor bars on longitudinal axis.

4. The accumulator conveying apparatus of claim 3 including adjustment means for adjusting the degree of staggering between the at least two rows of teeth.

5. The accumulator conveying apparatus of claim 1 including a first, a last and multiple intermediate conveyor banks, said sensors positioned whereby said intermediate conveyor banks are controlled for accumulating elongated stock being conveyed thereon and said last conveyor bank drive is further connected to a demand sensor for delivering a single elongated stock upon demand from said last conveyor bank to a subsequent material handling system.

6. A conveyor for sequentially conveying and accumulating elongated stock such as tubes, rods, bars and like articles, comprising;
    a series of at least three independently operable conveyor banks sequentially arranged for transferring elongated stock from one bank to an adjacent bank;
    each conveyor bank including a plurality of elongated bars arranged in parallel to each other and extending transverse to the desired direction of conveyance for the elongated stock to be conveyed, first and second adjacent rows of teeth extending with and protruding from each elongated bar at different angles of radial extension, the teeth of said first row staggered with respect to the teeth of said second row, and an oscillating drive connected to said bars for simultaneously oscillating said bars on longitudinal axis of elongation whereby said first and second rows of teeth are alternately raised one above the other such that elongated stock placed on the teeth of one end of said bars will be moved to the other end of the bars on the conveyor banks;
    sensors positioned on each of said conveyor banks for sensing the presence of elongated stock on each conveyor bank and connected for energizing and deenergizing selected ones of said oscillating drives whereby elongated stock fed onto one end of the conveyor is moved to the other end of the conveyor and elongated stock is accumulated thereon between conveyor ends.

7. The conveyor of claim 6 wherein said teeth are comprised of resilient material for preventing marring of elongated stock being conveyed thereon.

8. The conveyor of claim 6 including adjustment means for adjusting the degree of staggering between said first and second adjacent rows of teeth.

9. The conveyor of claim 6 including a first, a last and multiple intermediate conveyor banks, said sensors positioned whereby said intermediate conveyor banks are controlled for accumulating elongated stock being conveyed thereon and said last conveyor bank oscillating drive is further connected to a demand sensor for delivering a single elongated stock upon demand to a subsequent material handling system.

* * * * *